US012149791B1

(12) United States Patent
Gupta et al.

(10) Patent No.: US 12,149,791 B1
(45) Date of Patent: Nov. 19, 2024

(54) SYSTEMS AND METHODS TO PREDICT VIEWERSHIP FOR MEDIA CONTENT

(71) Applicant: WideOrbit LLC, San Francisco, CA (US)

(72) Inventors: Abhishek Gupta, Pune (IN); Narayanan Vijaykumar, Cupertino, CA (US)

(73) Assignee: WideOrbit LLC, San Francisco, CA (US)

( * ) Notice: Subject to any disclaimer, the term of this patent is extended or adjusted under 35 U.S.C. 154(b) by 0 days.

(21) Appl. No.: 18/468,116

(22) Filed: Sep. 15, 2023

(51) Int. Cl.
 *H04N 21/466* (2011.01)
 *H04N 21/45* (2011.01)

(52) U.S. Cl.
 CPC ..... *H04N 21/4667* (2013.01); *H04N 21/4532* (2013.01)

(58) Field of Classification Search
 None
 See application file for complete search history.

(56) References Cited

U.S. PATENT DOCUMENTS

| | | | | |
|---|---|---|---|---|
| 9,514,436 | B2* | 12/2016 | Marci | H04N 21/44218 |
| 2014/0165106 | A1* | 6/2014 | Zaveri | H04N 21/44226 725/46 |
| 2018/0020251 | A1* | 1/2018 | Hull | H04N 21/23406 |
| 2021/0084375 | A1* | 3/2021 | Park | H04N 21/4532 |
| 2022/0256219 | A1* | 8/2022 | Saafi | H04N 21/25891 |
| 2022/0284499 | A1* | 9/2022 | Dornadula | G06Q 30/0244 |
| 2022/0337903 | A1* | 10/2022 | Magnuson-Skeels | H04N 21/44222 |
| 2023/0370663 | A1* | 11/2023 | Aberman | H04N 21/252 |
| 2024/0121457 | A1* | 4/2024 | Kazemi Rad | H04N 21/25891 |

* cited by examiner

*Primary Examiner* — Alexander Q Huerta
(74) *Attorney, Agent, or Firm* — Seed Intellectual Property Law Group LLP

(57) ABSTRACT

Systems, methods, and articles for using an ensemble model to predict a number of impressions that media content programs will receive at a future time. The ensemble model is comprised of a plurality of machine learning models trained based on static and dynamic features obtained from historical impression data and media content program attributes. Static and dynamic features extracted from attributes of a media content program are applied to the ensemble model to generate a prediction of the number of impressions that the media content program will receive at a future time.

17 Claims, 9 Drawing Sheets

SYSTEMS AND METHODS TO PREDICT VIEWERSHIP FOR MEDIA CONTENT

BACKGROUND

Technical Field

The present disclosure relates the field of computer technology, and more particularly, to computer systems and methods that facilitate the delivery of content to consumers and that determine whether the content will receive a threshold number of impressions.

Description of the Related Art

Content providers such as radio stations and networks, television stations and networks, and Webcasters provide programming including content which is the subject of programming. Content providers' delivery of content is often via broadcasts or Webcasts (collectively, "mediacasts"). While content providers may employ repeaters and the like, broadcasts are typically limited in range to a geographic region. Additionally, programming may be provided via broadcast streams and webcast streams ("digital streams") that are transmitted at nearly the same time.

Programming often includes advertisements interspersed with the subject matter of the programming. The advertisements may occur in segments or slots sometimes referred to as "ad breaks." Content providers typically sell advertising time to generate revenue to fund operation, as well as generate profits, where the content provider is a commercial entity rather than a nonprofit entity. Advertisers typically offer to buy this advertising time to advertise their products or services. For example, Advertiser A may offer Content Provider B $1000 to buy advertisement time played during Television Show C.

BRIEF SUMMARY

A method of operating a computer system, may be summarized as including: receiving an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and for each respective media content program of the plurality of media content programs: extracting a plurality of features from the impression data and the one or more attributes of the respective media content program, the plurality of extracted features including one or more static features and one or more dynamic features; receiving an indication of a future time at which the respective media content program is scheduled to air; and generating a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

The ensemble model may include at least one time series machine learning model at least one deep learning model. A first portion of the one or more static features and a first portion of the one or more dynamic features may be applied to the at least one time series machine learning model, and a second portion of the one or more static features and a second portion of the one or more dynamic features may be applied to the at least one deep learning model.

The one or more static features may include one or more of: a viewership rating for the respective media content program; a type of the respective media content program; a length of the respective media content program; one or more geographic regions in which the respective media content program is aired; or one or more times at which the respective media content program is scheduled to be aired.

The one or more dynamic may include one or more of: one or more dates and times at which the respective media content program has aired in the past; one or more demographics of audience members of the respective media content program; a number of impressions received by the respective media content program from each demographic of the one or more demographics for at least one date and time of the one or more dates and times at which the respective media content program has aired in the past; or an average number of impressions that have been received by the respective media content program during a predetermined time period.

Extracting the plurality of features may include one or more of: normalizing the impression data and the one or more attributes of the respective media content program; cleaning the impression data and the one or more attributes of the respective media content program; or imputing missing data from the impression data and the one or more attributes of the respective media content program.

Extracting the plurality of features may further include: identifying one or more audience demographics associated with the respective media content program; and organizing the impression data and the one or more attributes of the respective media content program based on the one or more audience demographics.

At least one media content program of the plurality of media content programs may be: an annually recurring media content program; or a media content program that has not previously aired.

The future time may be a first future time, and the method may further include: at a second future time, receiving an indication of the number of impressions received for one or more media content programs of the plurality of media content programs; and re-training at least one machine learning model included in the ensemble model based on the prediction of a number of impressions for the one or more media content programs and the indication of the number of impressions received for the one or more media content programs.

Generating the predicted number of impressions by applying the ensemble model to the one or more static features, the one or more dynamic features, and the indicated future time, may further include: determining a classification of each slot of one or more slots associated with the media content program based on past impression data for the media content program; identifying one or more machine learning models included in the ensemble model based on the classification of each slot; and generating the predicted number of impressions by applying the one or more machine learning models to the one or more static features, the one or more dynamic features, and the indicated future time.

A method of operating a computer system may be summarized as including: receiving an indication of a plurality of media content programs, each media content program being associated with at least one media content provider; and for each respective media content program of the plurality of media content programs: receiving an indication of impression data for the respective media content program, the impression data including one or more demographics and one or more impression counts; receiving an indication of one or more attributes of the respective media content program; and extracting a plurality of features from the impression data and the one or more attributes of the respective media content program, the plurality of extracted features including one or more static features and one or more dynamic features; training an ensemble model to predict the number of impressions that will be received by a media content program at a future time based on the extracted features, the ensemble model including a plurality of machine learning models.

Training the ensemble model may further include: obtaining a plurality of predictions by applying historical slot data for the plurality of media content programs to the trained ensemble model; classifying one or more slots based on the plurality of predictions; splitting the plurality of predictions into a plurality of groups of predictions based on one or more slot classifications; and for each group of predictions of the plurality of groups of predictions: aggregate the predictions included in the plurality of groups of predictions; and create a machine learning model based on the aggregated predictions, such that the ensemble model uses the created machine learning model to predict a number of impressions for a slots with a classification that is the same as the classification associated with the group of predictions.

A system used to generate a prediction of the number of impressions that will be received by a media content program may comprise: at least one processor; and at least one memory coupled to the at least one processor, the at least one memory having computer-executable instructions stored thereon that, when executed by the at least one processor, cause the system to: receive an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and for each respective media content program of the plurality of media content programs: extract a plurality of features from the impression data and the one or more attributes of the respective media content program, the plurality of extracted features including one or more static features and one or more dynamic features; receive an indication of a future time at which the respective media content program is scheduled to air; and generate a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

A non-transitory processor-readable storage medium that stores at least one of instructions or data, the instructions or data, when executed by at least one processor, cause the at least one processor to: receive an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and for each respective media content program of the plurality of media content programs: extract a plurality of features from the impression data and the one or more attributes of the respective media content program, the plurality of extracted features including one or more static features and one or more dynamic features; receive an indication of a future time at which the respective media content program is scheduled to air; and generate a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

DETAILED DESCRIPTION

Figure 1:
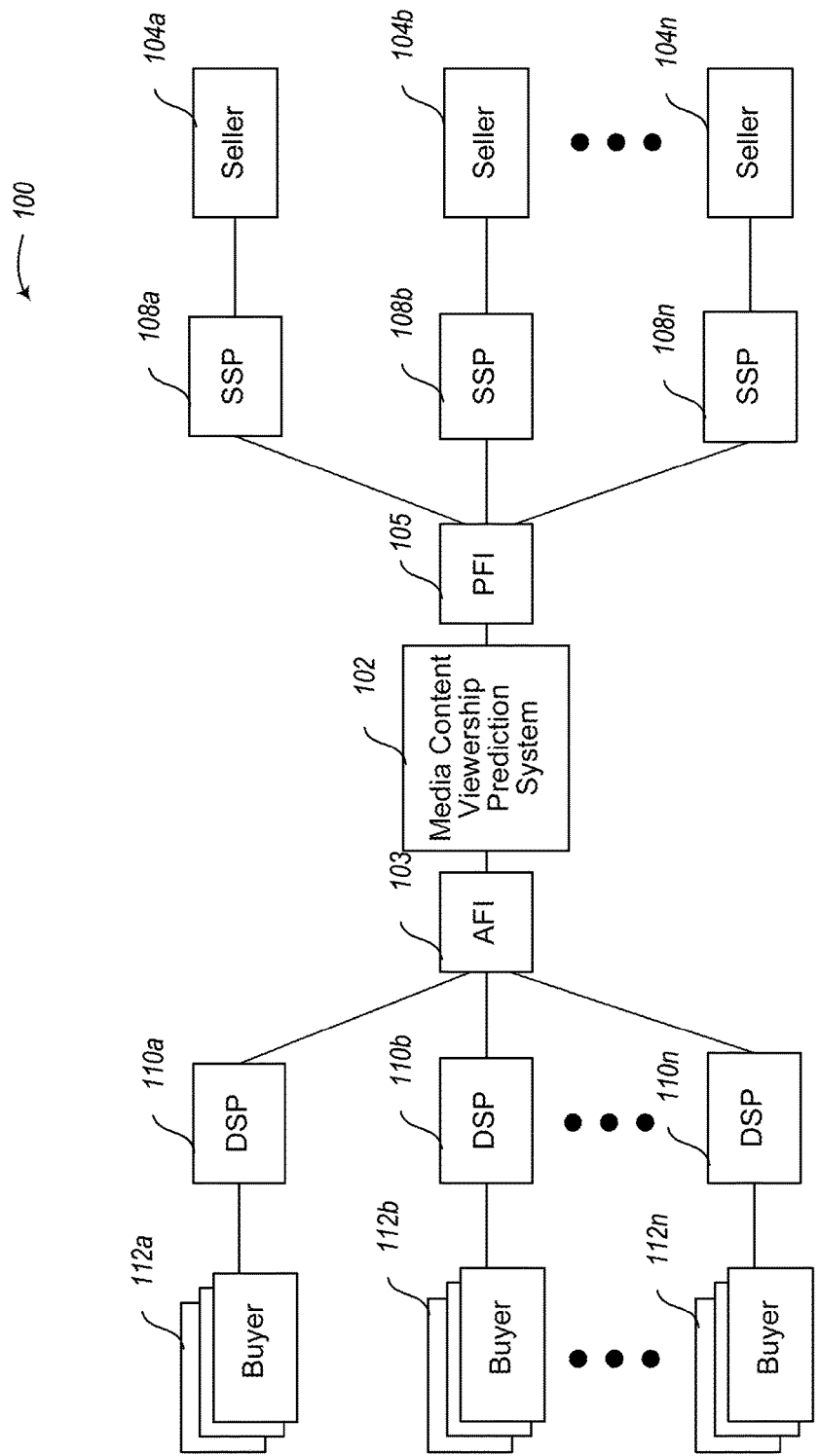
FIG. 1 shows an example networked environment according to one illustrated implementation in which various apparatus, methods and articles described herein may operate.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to computer-implemented systems and methods used for automating and optimizing the buying and selling of advertisements, or "spots." Buying and selling television, radio or digital advertising spots has traditionally been a highly manual process and requires many participants to execute orders. Layering in audience and pricing data adds another level of complexity to the campaign execution workflow.

More recent conventional techniques that buyers use for buying and selling such spots are implemented with computer systems, however these recent techniques are flawed. These techniques include attempting to determine how many impressions a media content program will receive by using an exponential moving average or a singular AI model. However, systems that use these techniques are unable to reliably and accurately predict the number of impressions that a media content program will receive because they are unable to obtain or use data directly from media content providers. Such systems attempt to estimate this data, however such techniques are unable to accurately estimate this data. Additionally, these systems use large amounts of computing resources, such as processing power, memory, networking bandwidth, etc., in order to make these estimations. As a result, such systems need to use computing resources to first obtain data that is used to predict a number of impressions, and then to use even more computing resources to actually generate the prediction. Second, such systems are unable to make predictions accurately and reliably about this data, such as the number of impressions that a media content program may receive, because they are working with data that is inaccurate from the start. This results in a need to use excess resources in order to adjust the data to make such predictions.

Implementations of the present disclosure are directed to computer-implemented systems and methods that predict the number of impressions that a media content program will receive at a future time by using an ensemble machine learning model. The ensemble machine learning model uses a combination of time-series and deep-learning models in order to make the prediction. Furthermore, the ensemble machine learning model may prioritize the use of certain machine learning models included in the ensemble model based on attributes of the media content program to reduce the number of computing resources used by the ensemble model to make the prediction.

Such implementations are thus able to improve the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by obtaining data regarding media content programs directly from media content providers, and using that data to predict the number of impressions a media content program will receive, the implementations described herein are able to build models that can predict the number of impressions a media content program will receive with fewer computing resources than other conventional techniques because the data needed to create the models does not need to be estimated based on other data. As another example, the implementations described herein are able to identify one or more models included in the ensemble model that are better able to predict the number of impressions for media content programs with certain attributes than other models included in the ensemble model. By identifying these models, the implementations described do not have to use all of the models included in the ensemble model to predict the number of impressions for media content programs, thereby reducing the overall amount of computing resources needed to use the ensemble model to predict the number of impressions a media content program will receive.

In at least some implementations, buyers and sellers can trade mediacast (e.g., broadcast, Webcast) advertisement inventory (e.g., direct or programmatically) at local, national, and/or worldwide levels. The types of media traded via may simultaneously include numerous types of media, including TV, cable, satellite, radio, outdoor, display, digital, print, etc. Such programmatic advertising implements data-driven automation of audience-based advertising operations which inverts the industry standard in which marketers rely on show ratings, or "impressions," to determine desirable audiences for the marketers' advertisements.

In some implementations, the augmentation systems disclosed herein automate aspects of billing, reconciliation, and creative execution. In some implementations, the augmentation systems may be integrated with advertisement management software and sales and traffic management systems.

FIG. 1 shows an example networked environment 100 according to one illustrated implementation in which various apparatus, methods and articles described herein may operate. The environment 100 includes a media content viewership prediction system 102 (a "viewership prediction system 102"), an advertiser-facing interface (AFI) 103, a media content provider-facing interface (PFI), a number of sellers or content providers 104A-104N (collectively 104), a number of seller side platforms (SSPs) 108A-108N (collectively 108), a number of demand side platforms (DSPs) 110A-110N (collectively 110), and a number of buyers 112A-112N (collectively 112), such as advertisers or agencies, all communicatively coupled by one or more networks or other communications channels. The various components of the environment may be distributed or integrated in any number of ways. For example, in at least some implementations, two or more of the DSPs 110, AFI 103, viewership prediction system 102, and PFI 105 may be integrated into a single platform provided by one or more entities.

In the example implementation, the viewership prediction system 102 generates a prediction of how many impressions a media content program will receive at a future time. In this example implementation, the viewership prediction system 102 uses an ensemble machine learning model to generate the prediction of the number of impressions the media content program will receive at a future time, such as by applying an indication of the media content program and the future time to the ensemble model. In some embodiments, the ensemble model includes one or more time series models and one or more deep learning models.

In another example implementation, the viewership prediction system 102 generates the ensemble machine learning model based on historical media content program data. In some embodiments, the viewership predication system 102 uses media content program data for a plurality of media content programs and historical impressions data for each of the media content programs to train the ensemble machine learning model. In some embodiments, the viewership prediction system identifies machine learning models included in the ensemble machine learning model that generate more accurate predictions for media content programs that typically receive impressions within a selected range of impressions or other attributes of media content programs that differentiate them from other media content programs. In such embodiments, the viewership prediction system 102 may use a portion of the machine learning models included in the ensemble model that include the selected machine learning models based on attributes, historical impression data, etc., of a media content program for which a prediction is generated.

Figure 2:
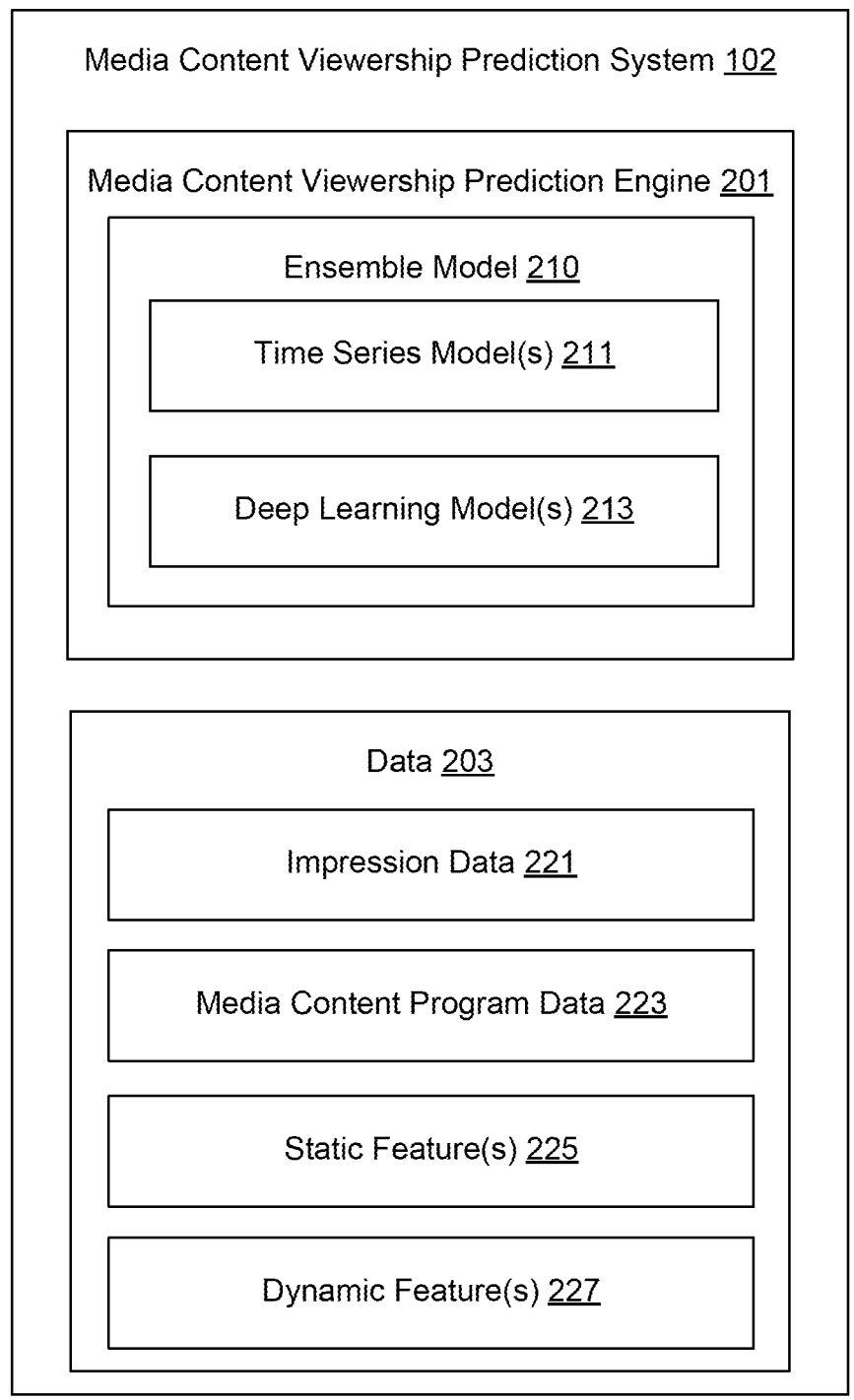
FIG. 2 is a block diagram showing sample elements of a media content viewership prediction system, according to one illustrated implementation.

FIG. 2 is a block diagram showing sample elements of a media content viewership prediction system 102 (a "viewership prediction system 102"), according to one illustrated implementation. The viewership prediction system 102 includes a media content viewership prediction engine 201 (a "viewership prediction engine 201") and data 203.

The viewership prediction engine 201 includes an ensemble machine learning model 210. The ensemble machine learning model 210 includes one or more time series models 211 and one or more deep learning models 213. The one or more time series models 211 may be or include one or more of: a statistical model, a linear regression model, a multi-layer perceptron model, a recurrent neural network, a long short-term memory model, a decision tree model, or other types of time series models. The one or more deep learning models 213 may be or include: a convolutional neural network, a long short-term memory model, a recurrent neural network, a generative adversarial network, a radial basis function network, a multi-layer perceptron, a deep belief network, an autoencoder, or other types of deep learning models.

In some embodiments, the viewership prediction engine 201 trains the ensemble machine learning model 210, and its constituent machine learning models, based on static features and dynamic features extracted from impression data and media content program data. In some embodiments, the viewership prediction engine 201 identifies patterns in the predictions generated by machine learning models included in the ensemble model, such as identifying whether some machine learning models are more accurate than other machine learning models for media content programs with certain attributes or that have historically received a number of impressions within a selected range of impressions.

The data 203 includes impression data 221, media content program data 223, one or more static features 225, and one or more dynamic features 227. The viewership prediction engine 201 may use a portion of the data 203 to train the ensemble model 210, to generate a prediction of a number of impressions a media content program will receive at a future time, or to perform any of the other features, processes, or functions described herein.

The impression data 221 includes historical data indicating the number of impressions received by a media content program over a period of time and an indication of one or more demographics that contributed to the impressions received by the media content. In some embodiments, the impression data 221 includes data indicating one or more "slots" during which the media content program aired and data indicating the number of impressions received by the media content program when it aired in the specified slot. A "slot" is a period of time, such as a quarter hour, half hour, hour, etc., during which a media content provider airs media content. For example, a television show may air during the 11:30 am-12:30 pm slot on Network A and during the 5:00 pm-6:00 pm slot on Network B. In some embodiments, the indication of one or more demographics included in the impression data 221 includes an indication of the number of impressions that the media content received and are attributable to the one or more demographics. For example, the indication of one or more demographics may indicate that twenty percent of the impressions were attributed to audience members who were between the ages of 18 and 35, that forty percent of the impressions were attributed to audience members who identify as male, and that thirty percent of the impressions were attributed to audience members who identify as female and between the ages of 18 and 35. In some embodiments, the historical impression data is obtained from an entity that tracks or collects impression data for one or more media content programs.

The media content program data 223 includes data describing media content programs that are aired by media content providers. The data describing a media content program includes one or more of: a title of the media content program; one or more target audiences of the media content program; an indication of one or more slots during which the media content program airs; an indication of a date and time at which the media content program airs; an indication of one or more media content providers that air the media content program; an indication of a content rating, such as G, PG. TV-G, etc., of the media content program; an indication of the length of the media content program; an indication of whether the media content program has aired in the past; an indication of when the media content program has aired in the past; an indication of a type of the media content program, such as a movie, television show, miniseries, documentary, award show, sporting event, preshow, prime television, premiere, promo, etc.; an indication of one or more genres for the media content program; an indication of the "true ratings" for the media content program, such as an indication of the number of impressions that an organization that measures the number of impressions media content programs receive has determined that the media content program has received in one or more slots; or other metadata related to a media content program.

The static features 225 include data describing one or more static features identified in the impression data 221 and media content program data 223 by the viewership prediction engine 201. A static feature represents data that does not, or has a low probability to, change over time, such as a name of a media content program, a type of the media content program, a content rating of a media content program, an intended demographic for the media content program, or other data related to a media content program or the impression history of the media content program that does not change over time.

The dynamic features 227 include data describing one or more dynamic features identified in the impression data 221 and media content program data 223 by the viewership prediction engine 201. A dynamic feature represents data that changes over time, such as a number of impressions that a media content program receives, a date that the media content program last aired, the demographics of audience members whose impressions are attributed to the media content program, or other data related to a media content program or the impression history of the media content program that may change over time.

Figure 3:
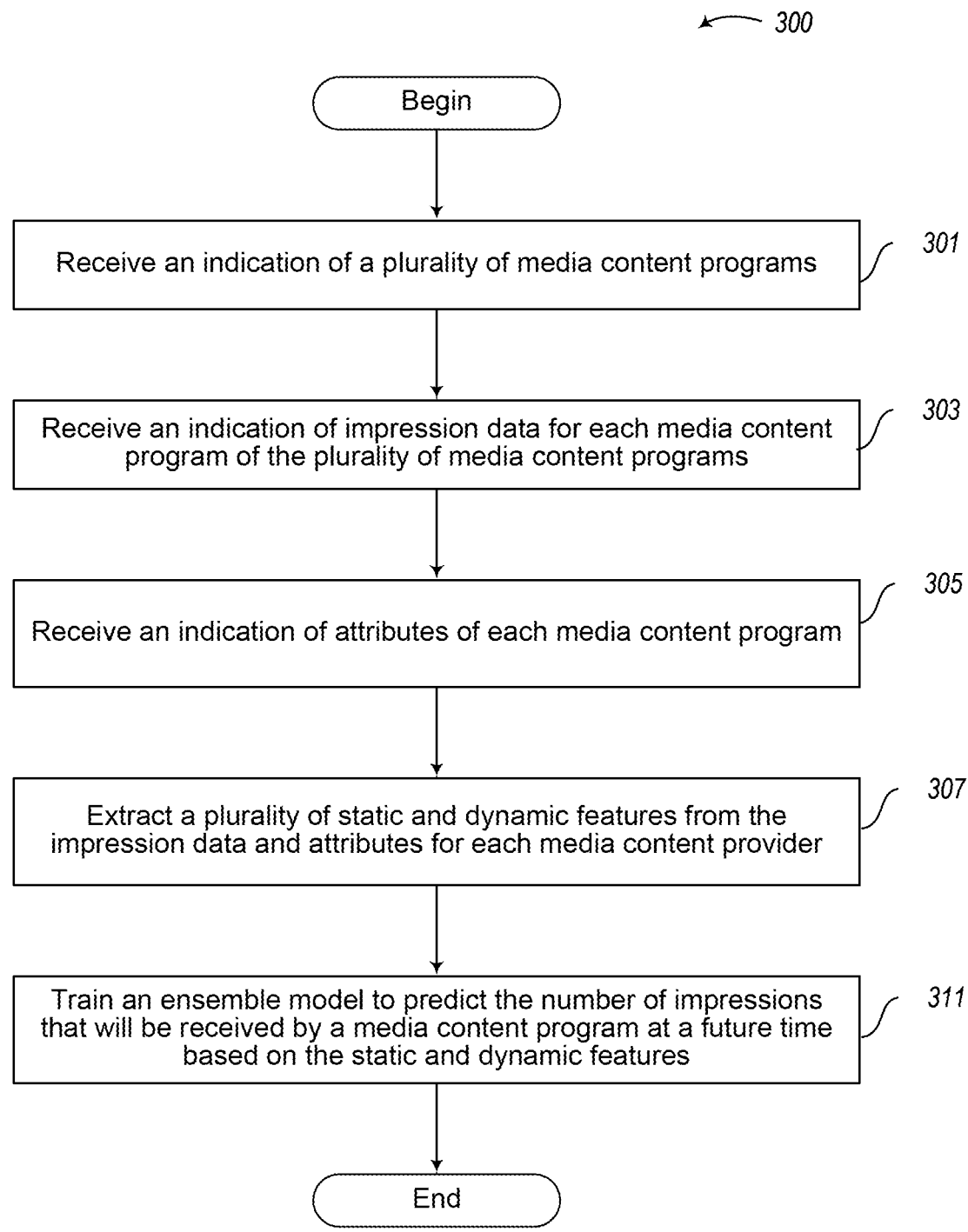
FIG. 3 is a flow diagram of a process for training an ensemble model according to various embodiments described herein.

FIG. 3 is a flow diagram of a process 300 for training an ensemble model according to various embodiments described herein. The process 300 may be performed by a media content viewership prediction system (a "viewership prediction system"), such as the media content viewership prediction system 102 described above in connection with FIG. 2. The process 300 begins, after a start block, at act 301 where the viewership prediction system receives an indication of a plurality of media content programs. In some embodiments, the indication of the plurality of media content programs is received from a plurality of media content providers via a provider facing user interface, such as the provider facing user interface 105 described above in connection with FIG. 1.

The process 300 proceeds to act 303, where the viewership prediction system receives an indication of impression data for each media content program of the plurality of media content programs. The impression data for each media content program may include data that is included in the impression data 221 described above in connection with FIG. 2.

The process 300 proceeds to act 305, where the viewership prediction system receives an indication of attributes of each media content program. The attributes for each media content program may include data that is included in the media content program data 223 described above in connection with FIG. 2. In some embodiments, the viewership prediction system determines whether a media content program is a special program, such as a program that airs one time, a program that airs annually, etc. In such embodiments, the viewership prediction system may determine that a media content program is a special program based on one or more attributes of other media content programs. For example, the viewership prediction system may identify a title of a media content program and determine that the title of the media content program has not been associated with other media content programs in the past. In another example, the viewership prediction system may identify the title of other media content programs to determine whether the media content program is a special program, such as by identifying whether other media content programs include the title of the media content program in their own title (for example, "Big Game 42 Pre-game Show," "7$^{th}$ annual Media Awards Red Carpet," etc.).

The process 300 proceeds to act 307, where the viewership prediction system extracts a plurality of static features and a plurality of dynamic features from the impression data and attributes for each media content program. In some embodiments, the extracted static features for a media content program include a viewership rating for the media content program, a type of the respective media content program, a length of the respective media content program, one or more geographic regions in which the media content program is aired, one or more times at which the respective media content program is scheduled to be aired, or some combination thereof. In some embodiments, the extracted dynamic features for a media content program include one or more dates and times at which the media content program has aired in the past, one or more demographics of audience members of the media content program, a number of impressions received by the media content program from each demographic of the one or more demographics for at least one date and time of the one or more dates and times at which the media content program has aired in the past, an average number of impressions that have been received by the media content program during a predetermined time period, or some combination thereof. In some embodiments, the extracted features include an average number of impressions for one or more demographics over a selected period of time (such as, the past n-number of days or hours, a range of dates, etc.) for each media content program.

In some embodiments, before act 307, the viewership prediction system pre-processes the impression data and attributes of the media content program. In such embodiments, the viewership prediction system uses the pre-processed data to extract the static features, dynamic features, or some combination thereof. Pre-processing may include cleaning the data, imputing missing data, normalization of media content program and past ratings data, or some combination thereof. In some embodiments, pre-processing the data includes organizing the data into groups, or "regions," based on demographic data, daypart data (such as data indicating a time of day during which a media content program aired, for example, during "prime time," "day time," "morning," "late night," or any other range of time that describes when a media content program airs), building block data, or some combination thereof. A building block may be data that is highly granular and describes a number of impressions attributed to audience members of a certain attribute. For example, building block data may indicate that a certain number of impressions for a media content program were attributed to men aged 22-24, 25-26, and 27-30, while other impressions were attributed to computer programmers earning between $70,000 and $100,000 per year and computer programmers earning less than $70,000. In some embodiments, pre-processing the data includes aggregating building blocks into larger demographic groups, such as aggregating men aged 22-24, 25-26, and 27-30 into one demographic group of men aged 22-30.

The process 300 proceeds to act 309, where the viewership prediction system trains an ensemble model to predict the number of impressions that will be received by a media content program at a future time based on the static and dynamic features. In some embodiments, the viewership prediction system trains the ensemble model by training one or more machine learning models included in the ensemble model. In some embodiments, the ensemble model includes one or more statistical models and one or more deep learning models. In some embodiments, the ensemble model is trained to generate a prediction of a number of impressions that a media content program will receive at a future time based on metadata and predictions generated by the machine learning models included in the ensemble model. In some embodiments, the ensemble model is trained to predict a level of contribution of one or more audience demographics to the predicted number of impressions. In some embodiments, the generated prediction includes an indication of one or more of: one or more demographics that are predicted to contribute to the predicted number of impressions; a prediction of the extent to which one or more demographics contribute to the predicted number of impressions; a prediction of the extent to which impressions are received from audience members located in one or more geographic regions; one or more building blocks predicted to contribute to the predicted number of impressions; a prediction of the extent to which one or more building blocks contribute to the predicted number of impressions; or other data related to the predicted number of impressions. In an example embodiment, training the ensemble model includes training the model to learn one or more weight combinations for combining predictions of statistical and deep learning models. In such an example embodiment, the ensemble model may select weights for statistical and deep learning models based on a slot for which a prediction is being made.

The viewership prediction system may train the one or more statistical models based on data indicating the daypart for media content programs, demographics for audiences of media content programs, building blocks associated with media content programs, other static or dynamic features, or some combination thereof. The one or more statistical models may be time series models that are able to account for one or more of: seasonality, trends, or cyclic behavior.

The viewership prediction system may train the one or more deep learning models based on data indicating the daypart for media content programs, demographics for audiences of media content programs, building blocks associated with media content programs, other static or dynamic features, or some combination thereof. The one or more deep learning models may be trained to use time varying and non-time varying features to create one or more predictions of a number of impressions a media content program may receive. In some embodiments, the one or more deep learning models generate predictions in an "autoregressive" way, and predictions can be generated for any number of days in the future.

After act 309, the process 300 ends.

Figure 4:
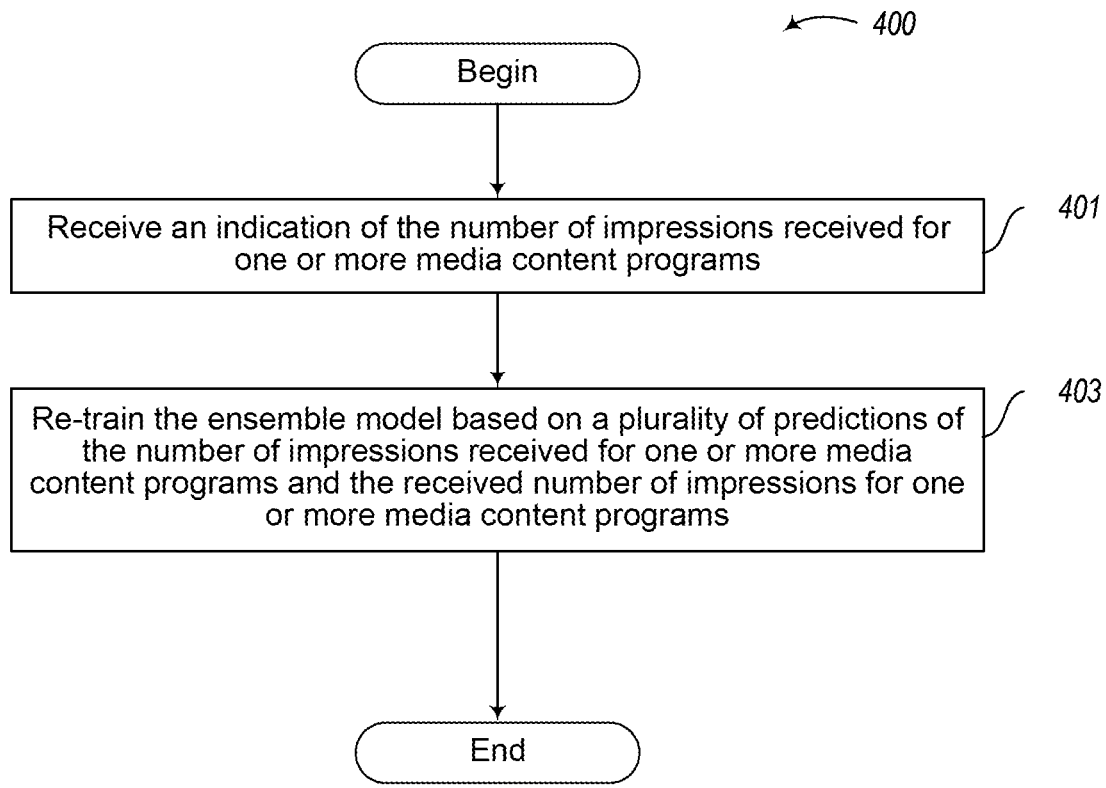
FIG. 4 is a flow diagram of a process for re-training an ensemble model, according to various embodiments described herein.

FIG. 4 is a flow diagram of a process 400 for re-training an ensemble model, according to various embodiments described herein. The process 400 may be performed by a viewership prediction system, such as the media content viewership prediction system 102 described above in connection with FIG. 2. The process 400 begins, after a start block, at act 401, where the viewership prediction system receives an indication of the number of impressions received for one or more media content programs. The one or more media content programs may be media content programs for which the viewership prediction system has already predicted a number of impressions.

The process 400 proceeds to act 403, where the viewership prediction system re-trains the ensemble model based on a plurality of predictions of the number of impressions that will be received for the one or more media content programs and the received number of impressions for the one or more media content programs. In some embodiments, the viewership prediction system re-trains the ensemble model in a similar manner to training the ensemble model at act 309, described above in connection with FIG. 3. In some embodiments, the viewership prediction system compares the indication of the impressions received for one or more media content programs with predicted impressions generated by the ensemble model for the one or more media content programs. In such embodiments, the viewership prediction system may determine whether to re-train the ensemble model based on the comparison of the indicated impressions and the predicted impressions.

After act 403, the process 400 ends.

Figure 5:
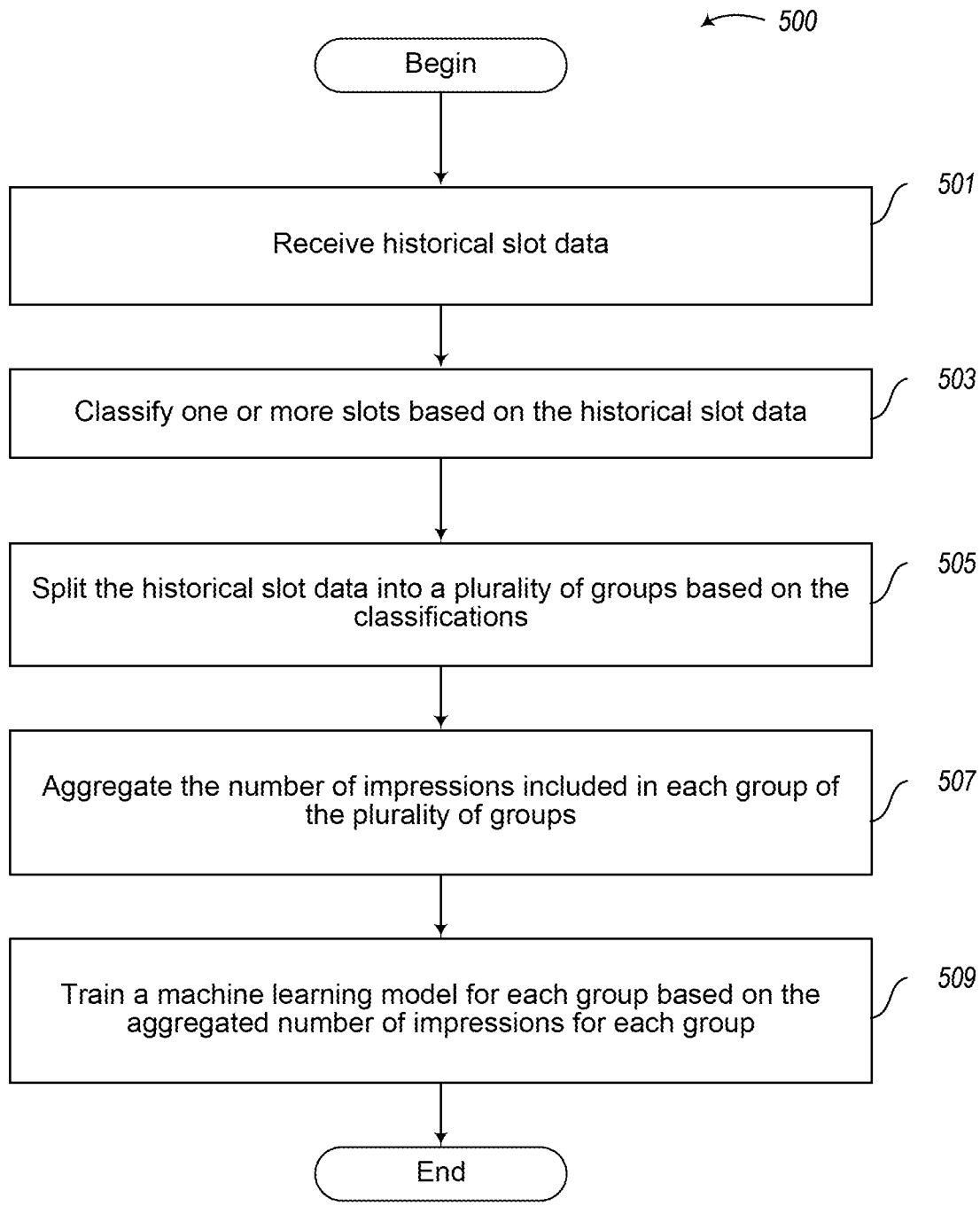
FIG. 5 is a flow diagram of a process for training one or more models included in the ensemble model, according to various embodiments described herein.

FIG. 5 is a flow diagram of a process 500 for training one or more models included in the ensemble model, according to various embodiments described herein. The process 500 may be performed by a viewership prediction system, such as the media content viewership prediction system 102 described above in connection with FIG. 2. The viewership prediction system may perform the process 500 as part of performing act 309 described above with respect to FIG. 3.

The process 500 begins, after a start block, at act 501, where the viewership prediction system receives historical slot data. In some embodiments, the viewership prediction system receives historical slot data indicating an actual number of impressions received for a plurality of media content programs that have already aired, one or more slots associated with each of the plurality of media content programs, one or more dayparts during which the media content program aired, or some combination thereof.

The process 500 proceeds to act 503, where the viewership prediction system classifies one or more slots based on the historical slot data. In some embodiments, the viewership prediction system classifies the one or more slots based on a number of impressions received for media content programs associated with each slots. For example, the viewership prediction system may classify the slots by determining whether the number of impressions received for the media content programs are within one of a plurality of threshold ranges of impressions. The threshold ranges may be based on a standard distribution, normal distribution, uniform distribution, binomial distribution, or other distributions or methods to determine threshold ranges.

The process 500 proceeds to act 505, where the viewership prediction system splits the historical data into a plurality of groups based on the classifications of the slots.

The process 500 proceeds to act 507, where the viewership prediction system aggregates the number of impressions included in each group of the plurality of groups. In some embodiments, the viewership prediction system aggregates the number of impressions for each group by calculating an average number of impressions for each group.

The process 500 proceeds to act 509, where the viewership prediction system trains a machine learning model for each group based on the aggregated number of impressions for each group. In some embodiments, the viewership prediction system trains multiple machine learning models for each group. In some embodiments, the viewership prediction system trains the machine learning model by using historical slot data that is identified based on the aggregated number of impressions for each group. In an example where the viewership prediction system generates a "low," "medium," and "high" group, the machine learning model trained for the low group may be trained on slot data for media content programs that receive impressions between the range of zero in impressions and the average number of impressions received for the medium group. Continuing the example, the machine learning model trained for the medium group may be trained with slot data for media content programs that receive impressions between the range of the average number of impressions for the low group and the average number of impressions for the high group, and the machine learning model may be trained for the high group with slot data for media content programs that receive impressions greater than the average number of impressions for the medium group.

After act 509, the process 500 ends. By performing the process described in FIG. 5 to train machine learning models within the ensemble model that are specialized for slots with certain attributes, such as historically receiving impressions within a threshold range of impressions, the ensemble model is able to more efficiently predict a number of impressions that a media content program will receive at a future time. For example, the ensemble model may be configured such that a subset of the machine learning models that include machine learning models specialized for slots with attributes similar to slots associated with the media content program are used to generate the prediction without using other machine learning models included in the ensemble model. Therefore, the ensemble model may use fewer computing resources, such as memory, processing power, networking bandwidth, etc., to generate the prediction because all of the machine learning models included in the ensemble model do not need to be used to generate the prediction.

In some embodiments, the ensemble model selects specialized machine learning models based on one or more attributes of a slot, and selects weights for the statistical and deep learning models included in the ensemble model based on the selected specialized machine learning models.

Figure 6:
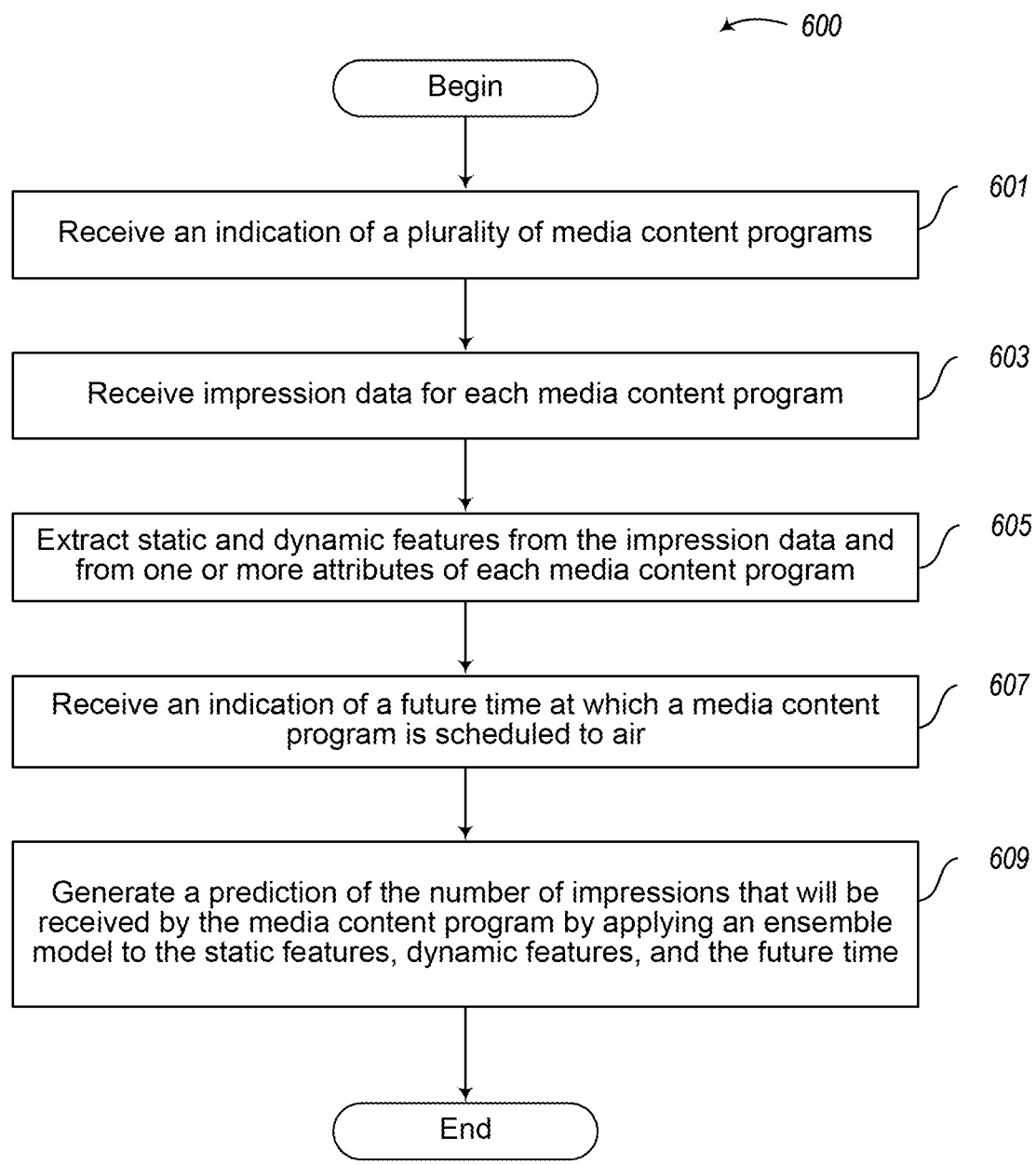
FIG. 6 is a flow diagram of a process to use an ensemble model to predict a number of impressions that a media content program will receive at a future time, according to various embodiments described herein.

FIG. 6 is a flow diagram of a process 600 to use an ensemble model to predict a number of impressions that a media content program will receive at a future time, according to various embodiments described herein. The process 600 may be performed by a viewership prediction system, such as the media content viewership prediction system 102 described above in connection with FIG. 2. The process 600 begins, after a start block, at act 601, where the viewership prediction system receives an indication of a plurality of media content programs. In some embodiments, the viewership predication system performs act 601 in a similar manner to act 301 described above in connection with FIG. 3. In some embodiments, at act 601, the viewership prediction system receives an indication of one or more attributes for each media content program of the plurality of media content programs.

The process 600 proceeds to act 603, where the viewership prediction system receives historical impression data for each media content program. In some embodiments, the viewership predication system performs act 603 in a similar manner to act 303 described above in connection with FIG. 3.

The process 600 proceeds to act 605, where the viewership prediction system extracts static and dynamic features from the impression data and from one or more attributes of each media content program. In some embodiments, the viewership predication system performs act 605 in a similar manner to act 307 described above in connection with FIG. 3.

The process 600 proceeds to act 607, where the viewership prediction system receives an indication of a future time at which a selected media content program is scheduled to air. In some embodiments, the viewership prediction system receives the indication of the future time, a selection of a media content program, or some combination thereof, from an advertiser facing user interface, a provider facing user interface, or some combination thereof.

The process 600 proceeds to act 609, where the viewership prediction system generates a prediction of the number of impressions that will be received by the media content program by applying an ensemble model to the static features, dynamic features, and the future time. In some embodiments the ensemble model is an ensemble model trained using one or more of the processes 300, 400, or 500 described above in connection with FIGS. 3, 4, and 5, respectively. In some embodiments, the prediction generated by the ensemble model includes an indication of one or more audience demographics, an indication of how many audience members of each demographic will contribute impressions to the total number of impressions received by the media content program at the future time. For example, the viewership prediction system may predict that one or more demographics will contribute a certain percentage of impressions to the total impressions received by a media content segment (e.g., men aged 18-40 contribute thirty percent of the impressions). In some embodiments, the viewership prediction system receives an indication of a geographic region, and the viewership prediction system generates a prediction of the number of impressions that will be received by the media content program in the geographic region by applying the ensemble model to the indicated geographic region, static features, dynamic features, and future time.

After act 609, the process 600 ends. In some embodiments, the generated prediction of the number of impressions is used to improve the functionality of other computing systems that use predicted impression data to perform their functions.

Figure 7:
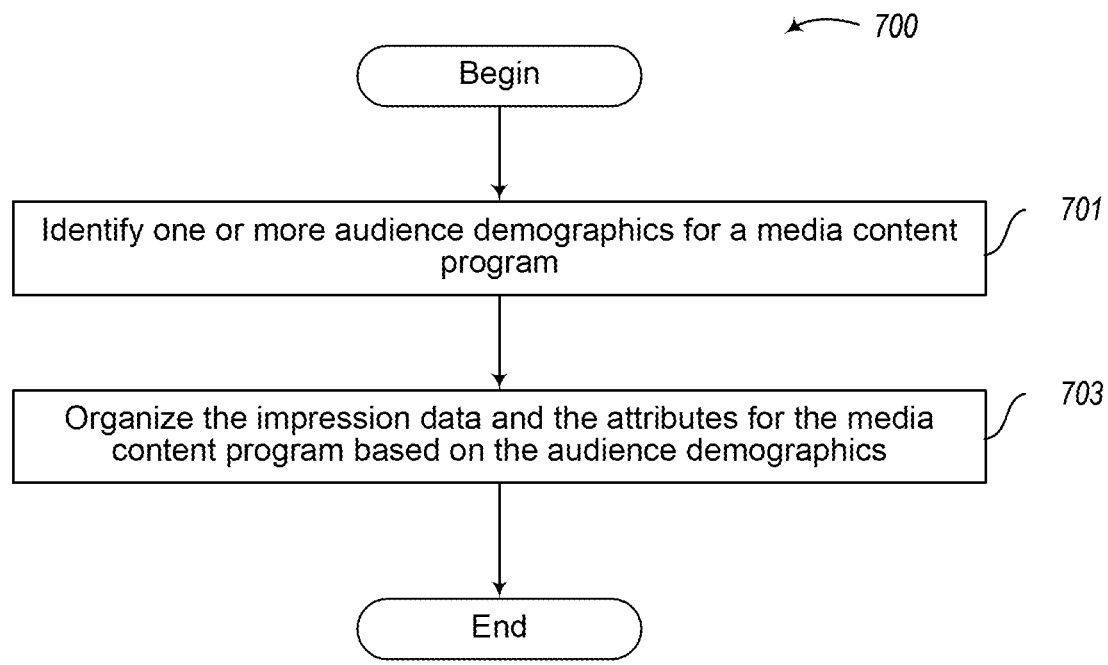
FIG. 7 is a flow diagram of a process for extracting demographic data from impression data and media content program attribute data, according to various embodiments described herein.

For example, the generated prediction of the number of impressions may be used by an audience delivery optimizer that assigns advertisements to slots in order to fulfill impression delivery goals for advertisement buyers. By using predictions generated via the process 600, which are more accurate than predictions generated by conventional systems, the audience delivery optimizer is able to assign advertisements to slots without having to expend additional resources to add assignments when impression goals are not met. The audience delivery optimizer is also able to more frequently assign advertisements to slots in a manner that ensures that excess impressions are not received by advertisements, which improves the ability of the audience delivery optimizer to ensure that multiple different buyers are all able to achieve their impression goals. FIG. 7 is a flow diagram of a process 700 for extracting demographic data from impression data and media content program attribute data, according to various embodiments described herein. The process 700 may be performed by a viewership prediction system, such as the media content viewership prediction system 102 described above in connection with FIG. 2. In some embodiments, the viewership prediction system performs the process 700 as part of performing act 307 or 605 described above in connection with FIGS. 3 and 6, respectively.

The process 700 begins, after a start block, at act 701, where the viewership prediction system identifies one or more audience demographics for a media content program. In some embodiments, the viewership prediction system identifies the one or more audience demographics based on one or more attributes of the media content program, impression data received for the media content program, or some combination thereof.

The process 700 proceeds to act 703, where the viewership prediction system organizes the impression data and the attributes for the media content program based on the audience demographics.

After act 703, the process 700 ends.

Figure 8:
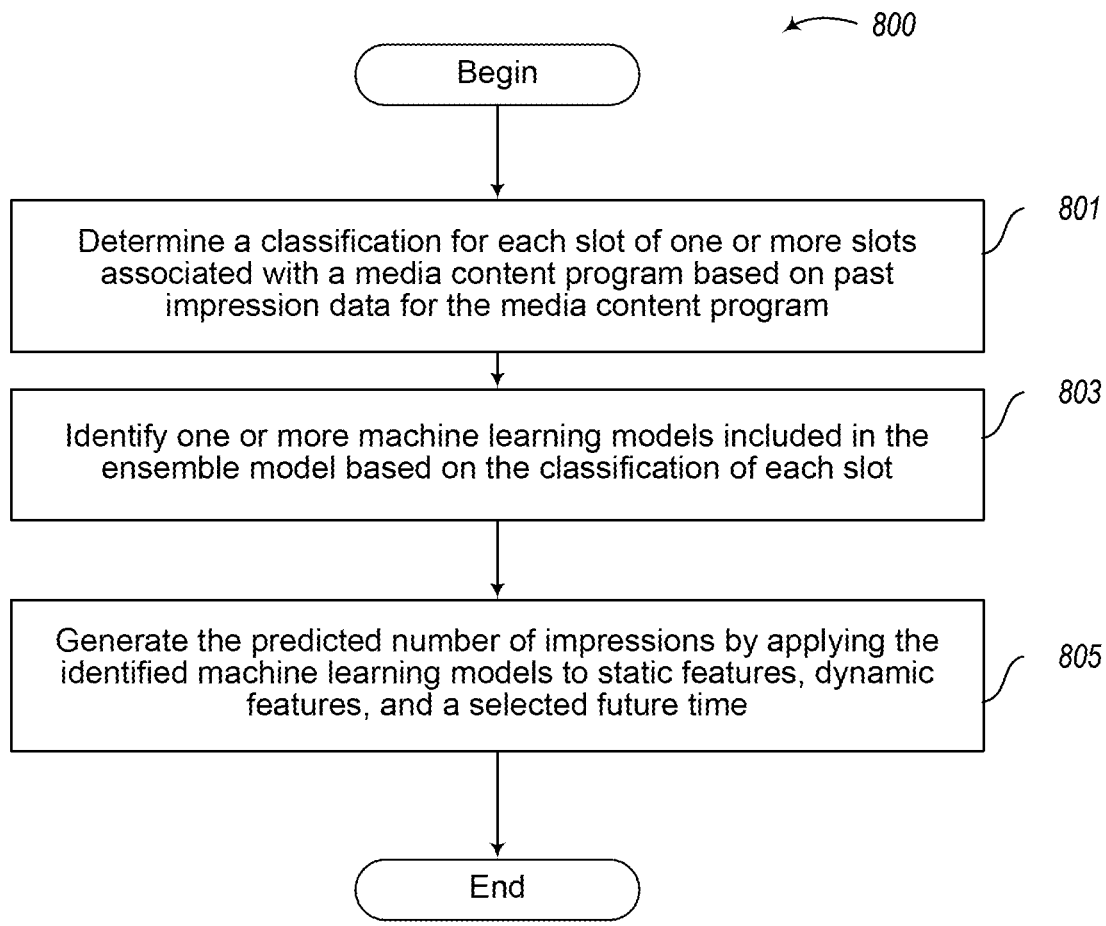
FIG. 8 is a flow diagram of a process for using selected machine learning models included in the ensemble model to generate the predicted number of impressions.

FIG. 8 is a flow diagram of a process 800 for using selected machine learning models included in the ensemble model to generate the predicted number of impressions. The process 800 may be performed by a viewership prediction system, such as the media content viewership prediction system 102 described above in connection with FIG. 2. In some embodiments, the viewership prediction system performs the process 800 as part of performing act 609 described above in connection with FIG. 6.

The process 800 begins, after a start block, at act 801, where the viewership prediction system determines a classification for each slot of one or more slots associated with a media content program based on past impression data for the media content program. In some embodiments, the viewership prediction system performs act 801 in a similar manner to act 503, described above in connection with FIG. 5. In some embodiments, the ensemble model includes a machine learning model trained to determine a classification for the one or more slots based on one or more static features, one or more dynamic features, or some combination thereof of the media content program, one or more slots, or some combination thereof. In such embodiments, the machine learning model is applied to one or more static features and one or more dynamic features to obtain the classification of the one or more slots. In some embodiments, the classifications are based on a number of impressions that a slot historically receives, a time at which the slot occurs, or some combination thereof.

The process 800 proceeds to act 803, where the viewership prediction system identifies one or more machine learning models included in the ensemble model based on the classification of each slot.

The process 800 proceeds to act 805, where the viewership prediction system generates the predicted number of impressions by applying the identified machine learning models to static features, dynamic features, and a selected future time. In some embodiments, the ensemble model is configured such that a subset of the machine learning models that include the identified machine learning models are used to generate the predicted number of impressions.

After act 805, the process 800 ends. In some embodiments, the ensemble model is configured to perform acts 801, 803, and 805 automatically.

Figure 9:
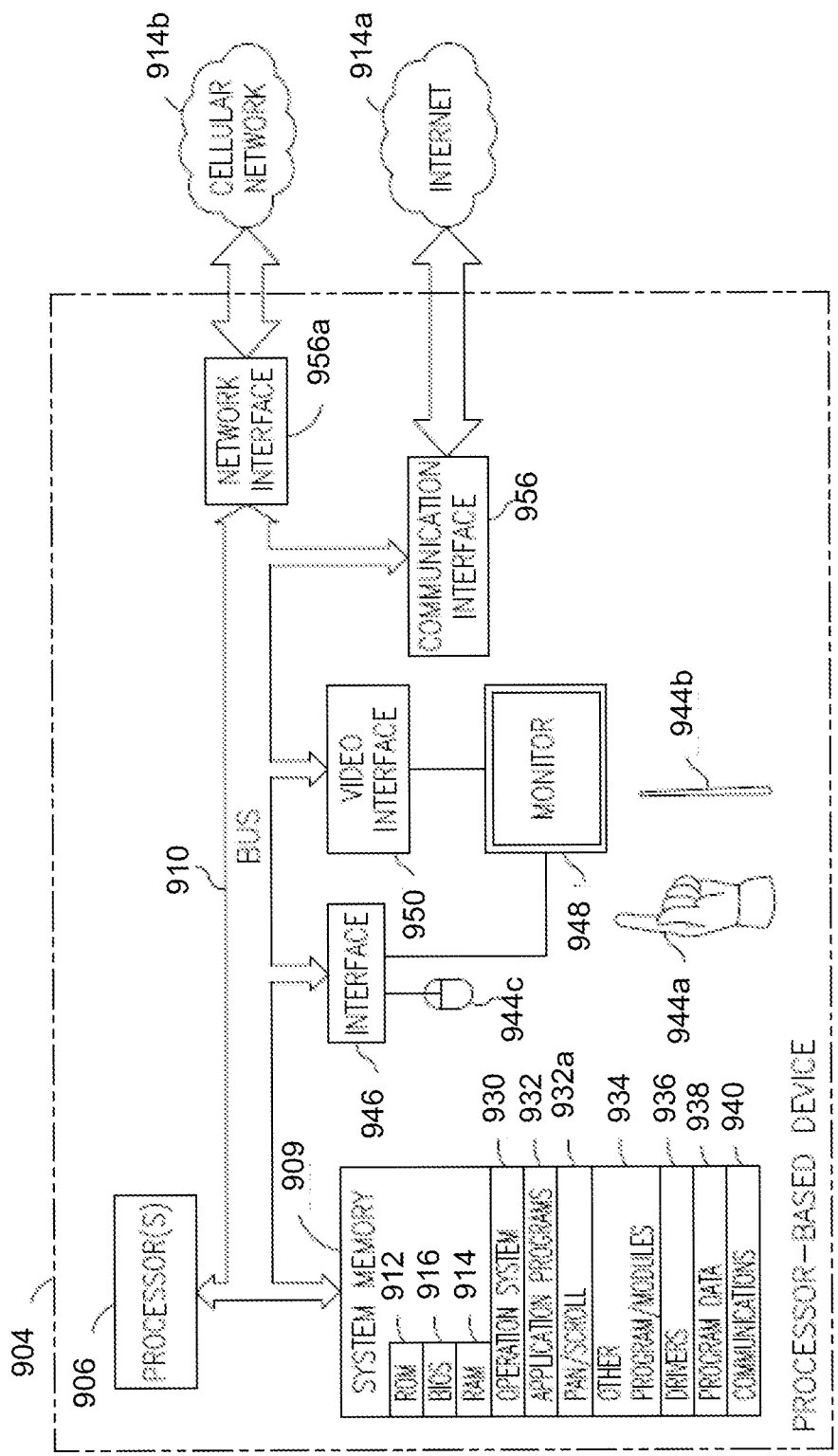
FIG. 9 shows a processor-based device suitable for implementing the various functionality described herein.

FIG. 9 shows a processor-based device 904 suitable for implementing the various functionality described herein. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 904 may include one or more processors 906, a system memory 908 and a system bus 910 that couples various system components including the system memory 908 to the processor(s) 906. The processor-based device 904 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 906 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 9 are of conventional design. As a result, such blocks need not be described in further detail herein, as they will be understood by those skilled in the relevant art.

The system bus 910 can employ any known bus structures or architectures, including a memory bus with memory controller, a peripheral bus, and a local bus. The system memory 908 includes read-only memory ("ROM") 912 and random access memory ("RAM") 914. A basic input/output system ("BIOS") 916, which can form part of the ROM 912, contains basic routines that help transfer information between elements within processor-based device 904, such as during start-up. Some implementations may employ separate buses for data, instructions and power.

The processor-based device 904 may also include one or more solid state memories, for instance Flash memory or solid state drive (SSD) 918, which provides nonvolatile storage of computer-readable instructions, data structures, program modules and other data for the processor-based device 904. Although not depicted, the processor-based device 904 can employ other nontransitory computer- or processor-readable media, for example a hard disk drive, an optical disk drive, or memory card media drive.

Program modules can be stored in the system memory 908, such as an operating system 930, one or more application programs 932, other programs or modules 934, drivers 936 and program data 938.

The application programs 932 may, for example, include panning/scrolling 932a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 932a may, for example, be stored as one or more executable instructions. The panning/scrolling logic 932a may include processor and/or machine executable logic or instructions to generate user interface objects using data that characterizes movement of a pointer, for example data from a touch-sensitive display or from a computer mouse or trackball, or other user interface device.

The system memory 908 may also include communications programs 940, for example a server and/or a Web client or browser for permitting the processor-based device 904 to access and exchange data with other systems such as user computing systems, Web sites on the Internet, corporate intranets, or other networks as described below. The communications programs 940 in the depicted implementation may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 9 as being stored in the system memory 908, the operating system 930, application programs 932, other programs/modules 934, drivers 936, program data 938 and server and/or browser 940 can be stored on any other of a large variety of nontransitory processor-readable media (e.g., hard disk drive, optical disk drive, SSD and/or flash memory).

A user can enter commands and information via a pointer, for example through input devices such as a touch screen 948 via a finger 944a, stylus 944b, or via a computer mouse or trackball 944c which controls a cursor. Other input devices can include a microphone, joystick, game pad, tablet, scanner, biometric scanning device, etc. These and other input devices (i.e., "I/O devices") are connected to the processor(s) 906 through an interface 946 such as touchscreen controller and/or a universal serial bus ("USB") interface that couples user input to the system bus 910, although other interfaces such as a parallel port, a game port or a wireless interface or a serial port may be used. The touch screen 948 can be coupled to the system bus 910 via a video interface 950, such as a video adapter to receive image data or image information for display via the touch screen 948. Although not shown, the processor-based device 904 can include other output devices, such as speakers, vibrator, haptic actuator, etc.

The processor-based device 904 may operate in a networked environment using one or more of the logical connections to communicate with one or more remote computers, servers and/or devices via one or more communications channels, for example, one or more networks 914a, 914b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 904 may include one or more wired or wireless communications interfaces 914a, 914b (e.g., cellular radios, WI-FI radios, Bluetooth radios) for establishing communications over the network, for instance the Internet 914a or cellular network.

In a networked environment, program modules, application programs, or data, or portions thereof, can be stored in a server computing system (not shown). Those skilled in the relevant art will recognize that the network connections shown in FIG. 9 are only some examples of ways of establishing communications between computers, and other connections may be used, including wirelessly.

For convenience, the processor(s) 906, system memory 908, network and communications interfaces 914a, 914b are illustrated as communicably coupled to each other via the system bus 910, thereby providing connectivity between the above-described components. In alternative implementations of the processor-based device 904, the above-described components may be communicably coupled in a different manner than illustrated in FIG. 9. For example, one or more of the above-described components may be directly coupled to other components, or may be coupled to each other, via intermediary components (not shown). In some implementations, system bus 910 is omitted and the components are coupled directly to each other using suitable connections.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a computer system, comprising:
receiving an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and for each respective media content program of the plurality of media content programs:

extracting a plurality of features from the impression data and the one or more attributes of the respective media content program, the plurality of extracted features including one or more static features and one or more dynamic features;

receiving an indication of a future time at which the respective media content program is scheduled to air; and generating a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

2. The method of claim 1, wherein the ensemble model comprises:
at least one time series machine learning model; and
at least one deep learning machine learning model.

3. The method of claim 2, wherein:
a first portion of the one or more static features and a first portion of the one or more dynamic features are applied to the at least one time series machine learning model, and
a second portion of the one or more static features and a second portion of the one or more dynamic features are applied to the at least one deep learning machine learning model.

4. The method of claim 1, wherein the one or more static features comprise one or more of:
a viewership rating for the respective media content program;
a type of the respective media content program;
a length of the respective media content program;
one or more geographic regions in which the respective media content program is aired; or
one or more times at which the respective media content program is scheduled to be aired.

5. The method of claim 1, wherein the one or more dynamic features comprise one or more of:
one or more dates and times at which the respective media content program has aired in the past;
one or more demographics of audience members of the respective media content program;
a number of impressions received by the respective media content program from each demographic of the one or more demographics for at least one date and time of the one or more dates and times at which the respective media content program has aired in the past; or
an average number of impressions that have been received by the respective media content program during a predetermined time period.

6. The method of claim 1, wherein extracting the plurality of features further comprises one or more of:

normalizing the impression data and the one or more attributes of the respective media content program;
cleaning the impression data and the one or more attributes of the respective media content program; or
imputing missing data from the impression data and the one or more attributes of the respective media content program.

7. The method of claim 1, wherein extracting the plurality of features further comprises:
identifying one or more audience demographics associated with the respective media content program; and
organizing the impression data and the one or more attributes of the respective media content program based on the one or more audience demographics.

8. The method of claim 1, wherein at least one media content program of the plurality of media content programs is:
an annually recurring media content program; or
a media content program that has not previously aired.

9. The method of claim 1, wherein the future time is a first future time, the method further comprising:
at a second future time, receiving an indication of the number of impressions received for one or more media content programs of the plurality of media content programs;
re-training at least one machine learning model included in the ensemble model based on the prediction of a number of impressions for the one or more media content programs and the indication of the number of impressions received for the one or more media content programs.

10. The method of claim 1, wherein generating the predicted number of impressions by applying the ensemble model to the one or more static features, the one or more dynamic features, and the indicated future time, further comprises:
determining a classification of each slot of one or more slots associated with the media content program based on past impression data for the media content program;
identifying one or more machine learning models included in the ensemble model based on the classification of each slot; and
generating the predicted number of impressions by applying the one or more machine learning models to the one or more static features, the one or more dynamic features, and the indicated future time.

11. A method of operating a computer system, comprising:
receiving an indication of a plurality of media content programs, each media content program being associated with at least one media content provider; and
for each respective media content program of the plurality of media content programs:
receiving an indication of impression data for the respective media content program, the impression data including one or more demographics and one or more impression counts;
receiving an indication of one or more attributes of the respective media content program; and
extracting a plurality of features from the impression data and the one or more attributes of the respective media content program, the plurality of extracted features including one or more static features and one or more dynamic features;
training an ensemble model to predict the number of impressions that will be received by a media content program at a future time based on the extracted features, the ensemble model including a plurality of machine learning models.

12. The method of claim 11, wherein training the ensemble model further comprises:
obtaining a plurality of predictions by applying historical slot data for the plurality of media content programs to the trained ensemble model;
classifying one or more slots based on the plurality of predictions;
splitting the plurality of predictions into a plurality of groups of predictions based on one or more slot classifications; and
for each group of predictions of the plurality of groups of predictions:
aggregate the predictions included in the plurality of groups of predictions; and
create a machine learning model based on the aggregated predictions, such that the ensemble model uses the created machine learning model to predict a number of impressions for a slots with a classification that is the same as the classification associated with the group of predictions.

13. A system, comprising:
at least one processor; and
at least one memory coupled to the at least one processor, the at least one memory having computer-executable instructions stored thereon that, when executed by the at least one processor, cause the system to:
receive an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and
for each respective media content program of the plurality of media content programs:
extract a plurality of features from the impression data and the one or more attributes of the respective media content program, the plurality of extracted features including one or more static features and one or more dynamic features;
receive an indication of a future time at which the respective media content program is scheduled to air; and
generate a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

14. The system of claim 13, wherein to extract the plurality of features the at least one processor is further caused to:

normalize the impression data and the one or more attributes of the respective media content program;
clean the impression data and the one or more attributes of the respective media content program; or
impute missing data from the impression data and the one or more attributes of the respective media content program.

15. The method of claim 13, wherein to extract the plurality of features the at least one processor is further caused to:
identify one or more audience demographics within which the respective media content program airs; and
organize the impression data and the one or more attributes of the respective media content program based on the one or more audience demographics.

16. The method of claim 13, wherein the future time is a first future time, and the at least one processor is further caused to:
at a second future time, receive an indication of the number of impressions received for one or more media content programs of the plurality of media content programs;
re-train at least one machine learning model included in the ensemble model based on the prediction of a number of impressions for the one or more media content programs and the indication of the number of impressions received for the one or more media content programs.

17. A non-transitory processor-readable storage medium that stores at least one of instructions or data, the instructions or data, when executed by at least one processor, cause the at least one processor to:
receive an indication of a plurality of media content programs, each media content program being associated with at least one media content provider, the indication of the plurality of media content programs including one or more attributes for each media content program of the plurality of media content programs and impression data for each media content program of the plurality of media content programs, the impression data including an indication of one or more demographics and one or more impression counts; and
for each respective media content program of the plurality of media content programs:
extract a plurality of features from the impression data and the one or more attributes of the respective media content program, the plurality of extracted features including one or more static features and one or more dynamic features;
receive an indication of a future time at which the respective media content program is scheduled to air; and
generate a prediction of a number of impressions that will be received by the respective media content program at the future time by applying an ensemble model to the one or more static features, the one or more dynamic features, and the indicated future time, the ensemble model including a plurality of machine learning models and being trained to generate a prediction of the number of impressions that will be received for a media content program at a future time based on at least one or more static features, one or more dynamic features, and a future time.

* * * * *